INVENTOR:
J. D. LOREN

Oct. 28, 1969        J. D. LOREN        3,474,878
ACOUSTIC WELL LOGGING SYSTEM AND METHOD FOR DETECTING FRACTURES
Filed July 28, 1967        4 Sheets-Sheet 2

INVENTOR:
J. D. LOREN
BY Theodore E. Bieber
HIS ATTORNEY

INVENTOR:
J. D. LOREN

United States Patent Office  3,474,878
Patented Oct. 28, 1969

3,474,878
ACOUSTIC WELL LOGGING SYSTEM AND METHOD FOR DETECTING FRACTURES
Jay D. Loren, New Orleans, La., assignor to Shell Oil Company, New York, N.Y., a corporation of Delaware
Filed July 28, 1967, Ser. No. 656,814
Int. Cl. G01r 1/40; G10k 11/00
U.S. Cl. 181—0.5                                      1 Claim

ABSTRACT OF THE DISCLOSURE

A method for detecting the presence of interfering wave types within an acoustic wave train and relating such anomalies to the presence of a fracture intersecting the borehole. A control signal is obtained and compared with the acoustic signals by a specialized AGC system and/or receivers on opposite sides of a transmitter. The comparison enhances the interfering waves and permits their easy recognition in order to locate fractures which intersect the borehole.

Cross reference to related application

The copending application of J. D. Loren entitled, "Method for Detecting Fractures in a Formation Penetrated by a Borehole," Ser. No. 374,742, filed June 12, 1964, now Patent No. 3,356,177 discloses the basic principles of fracture detection by recognition of anomalous interference patterns within acoustic wave trains.

Background of the invention

The copending application discloses that reflected, diffracted, and converted wave types are generated when an acoustic wave impinges upon a fracture plane intersecting a borehole. These waves, which are anomalous to the normal wave trains of an unfractured formation, are recognizable by the anomalous interference patterns produced within a sequence of the wave trains. The magnitudes and the arrival times of the anomalous waves within each of the wave trains are controlled by the spatial relationship of the fracture-borehole intersection and the logging sonde, which contains at least one transmitter and one receiver. Because the arrival times of the anomalous waves are highly sensitive to small changes in the spatial relation of the borehole-fracture intersection and the logging sonde, it is necessary that at least one receiver signal be obtained per inch of travel of the logging sonde.

The anomalous interference patterns within a series of wave trains are a result of mode conversion of specific wave types at the borehole-fracture intersection. An acoustical wave that impinges upon the borehole-fracture intersection causes the intersection to act as a secondary source and radiate energy in the form of compressional and shear (or pseudo-Rayleigh) waves within the formation and compressional waves within the borehole fluid. For discussion purposes we denote these segments as P, S, and F, respectively. Because each of the three waves also activates the intersection as a secondary source, a total of six different mode-converted waves exist as summarized in Table I. In addition, reflected waves denoted as PP and SS exist when the sonde lies entirely above or below the borehole-fracture intersection.

The copending application and the present patent application are both directed toward recognizing the presence of the interfering waves. In most instances it is impossible to examine an oscillogram of a single wave train and identify each of the individual events due to earlier-arriving events obscuring the later interfering events of interest. Successful recognition of the presence of the interfering waves is contingent upon a system whereby a "normal" wave is made available for comparison. There are two basic approaches to obtaining a "normal" wave for comparison purposes. The first is to control the photographic presentation so that the eye automatically recognizes the presence of the interfering waves. The second is to provide suitable instrumentation so that the comparison is done, at least in part, electronically.

The copending application describes a logging tool consisting of at least one transmitter and one receiver separated by several feet. As the tool is moved through the borehole, acoustic impulses are generated and received at such a rate that at least one wave train is detected per inch of tool movement within the borehole. The electrical analogs of the acoustical signals are transmitted to the surface and displayed in such a manner that the eye easily recognizes the presence of anomalous acoustic events. It is the display of the signals in conjunction with the intense number of signals per unit of tool movement that governs the ease with which the interfering waves can be detected.

Summary of the invention

In accordance with the present invention acoustic impulses are generated within the borehole of a well. A source of acoustic impulses is moved along the borehole while it produces at least one impulse per inch of travel. Acoustic wave trains are received and converted to related electrical signals at at least one point which is kept at a constant distance from the source of the impulses. Control signals are produced from series of acoustic wave trains that travel along adjacent intervals within the borehole and are applied to each acoustic wave train signal in order to emphasize any anomalies it may contain. The modified acoustic wave train signals are visibly displayed, preferably as a series of side-by-side oscillograms, in relation to depth within the borehole. The display shows the depths at which interference patterns move through generally normal wave trains, and these are the depths at which fractures are encountered by the borehole.

Brief description of the drawing

The above advantages of this invention will be more easily understood from the following detailed description when taken in conjunction with the attached drawing in which.

TABLE I.—MODE-CONVERTED WAVES

| Notation: | Transmitter-to-Fracture Wave Type | Fracture-to-Receiver Wave Type |
|---|---|---|
| PF | Refracted compressional | Direct fluid compressional. |
| FP | Direct fluid compressional | Refracted compressional. |
| SF | Refracted shear (pseudo-Rayleigh) | Direct fluid compressional. |
| FS | Direct fluid compressional | Refracted shear (pseudo-Rayleigh). |
| SP | Refracted shear (pseudo-Rayleigh) | Refracted compressional. |
| PS | Refracted compressional | Refracted shear (pseudo-Rayleigh). |

Figure 2A:
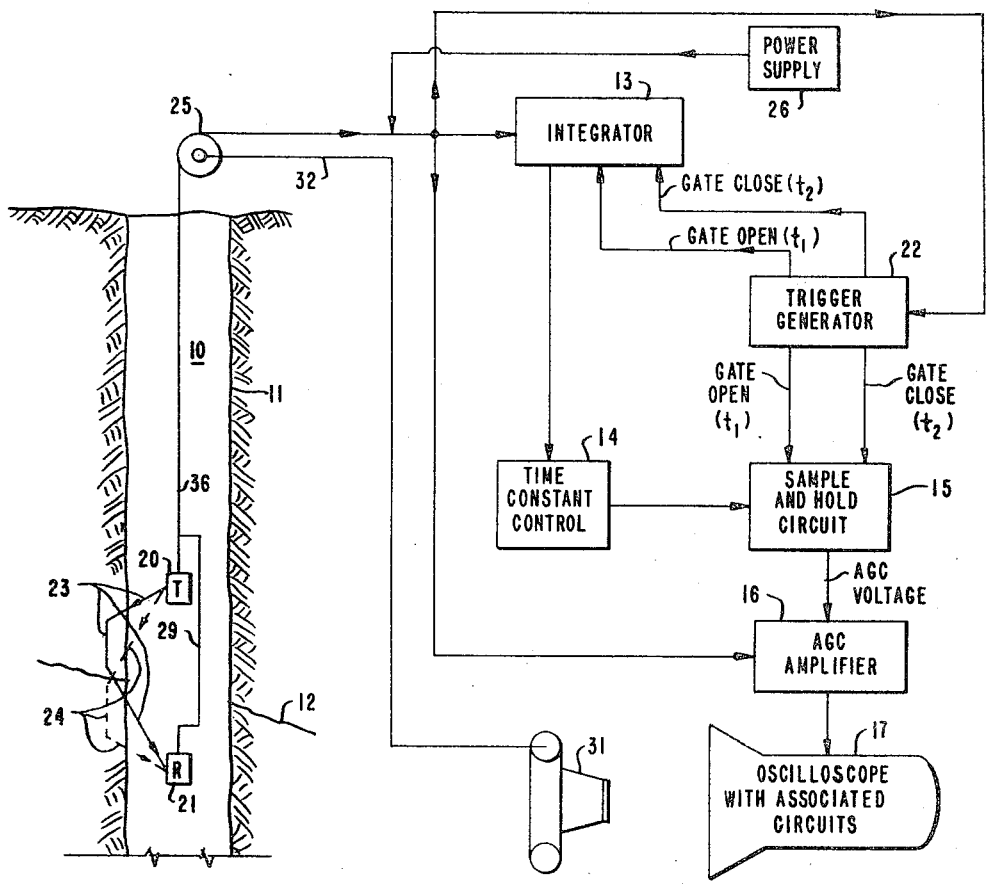
FIGURE 2a shows an embodiment of the invention using a preferred arrangement for an automatic gain control system which incorporates a sample and hold circuit.
Figure 2B:
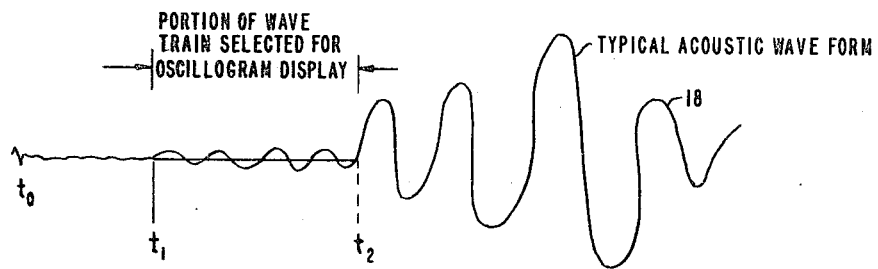
FIGURE 2b illustrates a typical waveform of the receiver signal.
Figure 3A:
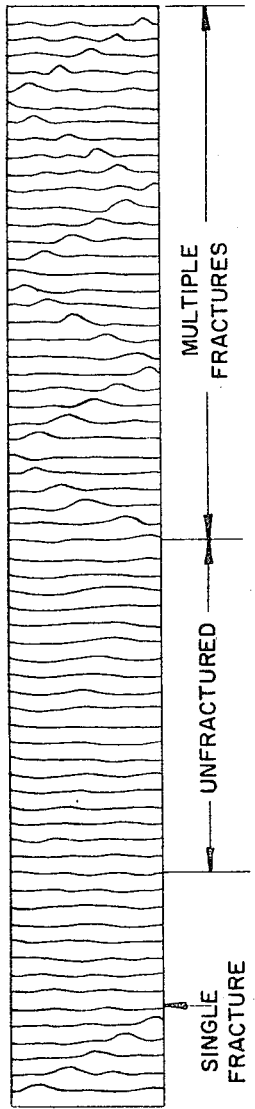
Figure 3B:
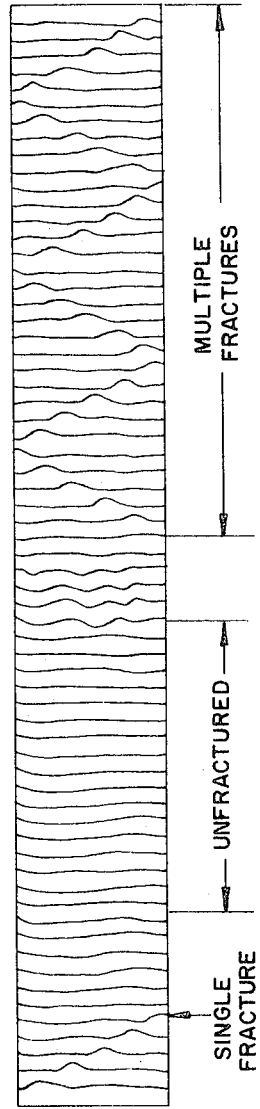
Figure 4:
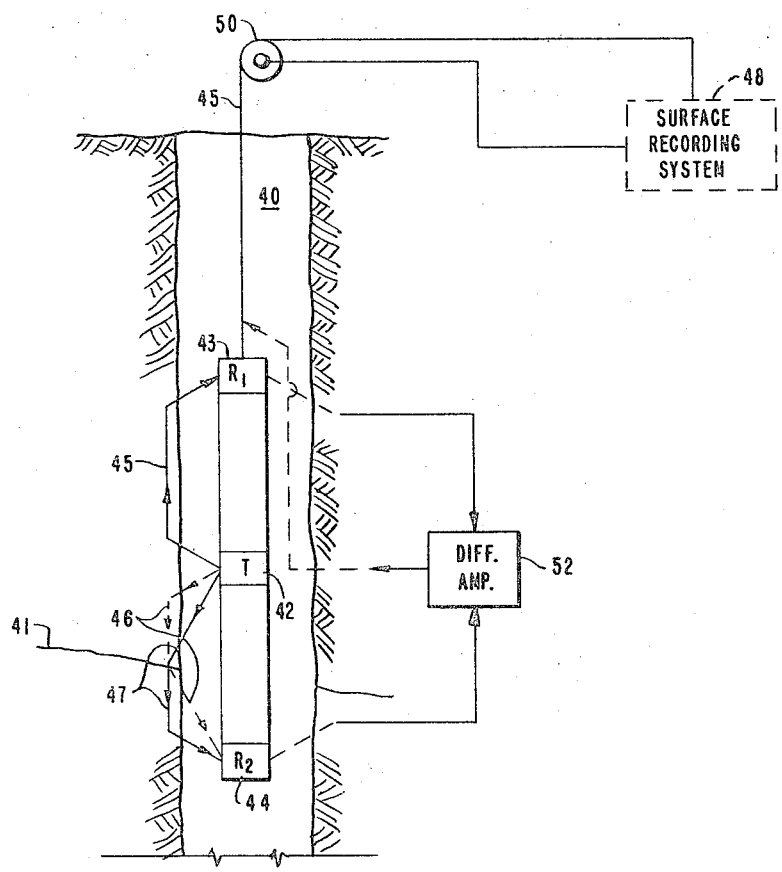

FIGURE 3a and 3b show records produced by the system of FIGURE 2;

FIGURE 4 shows a second embodiment of the invention using a downhole difference amplifier and receivers on opposite sides of a transmitter.

Description of preferred embodiment

Figure 1:
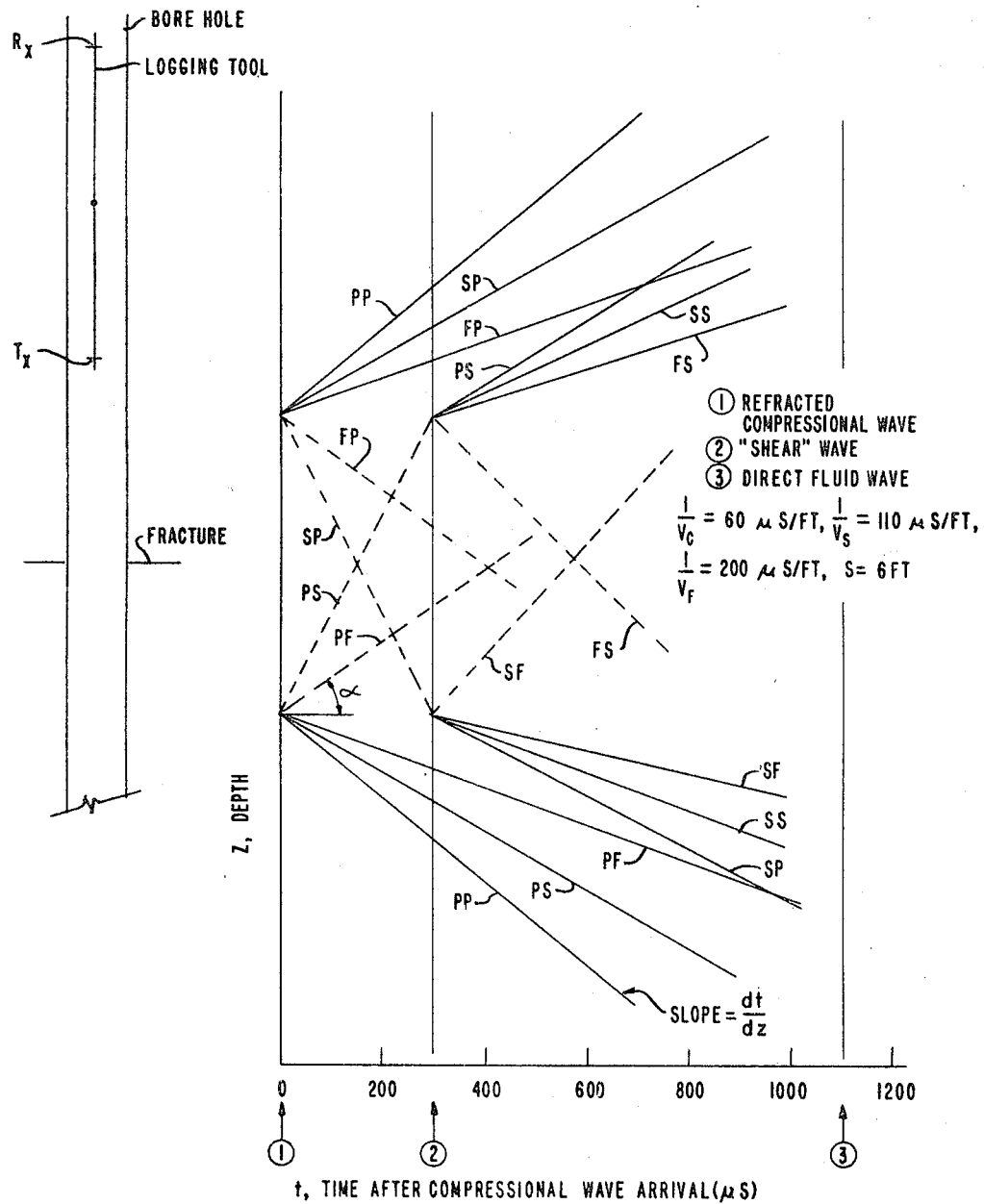
FIGURE 1 schematically illustrates a logging tool in a borehole that encounters a fracture and shows the arrival times of the interfering waves that are due to the fracture.

Referring to FIGURE 1 it is apparent that the arrival time of each of the mode-converted and reflected waves within an individual wave train is dependent upon the spatial relationship of the sonde and the fracture plane. The change in arrival time of a given mode-converted or reflected event with respect to a change in sonde position ($dt/dz$) is a simple function of the velocities of the formation and borehole fluid. When the tool straddles the fracture, $|dt/dz|$ is equal to the difference of the reciprocal velocities of the two segments of a given wave. When the tool lies entirely above or below the fracture plane, $|dt/dz|$ is equal to the sum of the appropriate reciprocal velocities. It is the magnitude of $dt/dz$ that governs the rate of advance or regression of an interference pattern through a series of side-by-side wave trains as the logging sonde moves past a fracture.

An optimum photographic presentation of a series of oscillograms arranged in columnar presentation will result when the angle between the time axis of FIGURE 1 and the arrival time versus depth trend of an interfering event lies between 30° and 45°. This angle, denoted as $\alpha$ and illustrated on FIGURE 1 for one specific event, is related to tool movement, oscilloscope time base, movement and dimensions of the film, and formation and fluid acoustical velocities according to $$\cot \alpha = \frac{\left|\frac{dt}{dz}\right|}{F}$$

where:

$F =$ $$\frac{\text{(unit length of film movement per foot of tool movement)}}{\text{(unit width of film per microsecond of time base)}}$$

and where, for example, $$\left|\frac{dt}{dz}\right| = \frac{1}{V_f} + \frac{1}{V_c} \begin{pmatrix} \text{PF or FP when tool is} \\ \text{above or below fracture} \end{pmatrix}$$

$$\left|\frac{dt}{dz}\right| = \frac{1}{V_f} - \frac{1}{V_c} \begin{pmatrix} \text{PF or FP when tool} \\ \text{straddles fracture} \end{pmatrix}$$

It is evident that proper control of the photographic parameters results in a high photographic density of oscillograms. For example, application of the technique in its preferred embodiment of 40 pulses per foot of tool movement within an acoustical environment characterized by $1/V_c = 60$ μsec./ft. and $1/V_f = 200$ μsec./ft.

and a preferred angle $\alpha$ of at least 30° causes F to be fixed according to $$F = \frac{\left|\frac{dt}{dz}\right|}{\cot \alpha} = \frac{\frac{1}{V_f} + \frac{1}{V_c}}{\cot \alpha} = \frac{200 + 60}{\cot 30°} = \frac{260}{1.73} = 150$$

A specific size of film such as 70 millimeter (with an effective width of 2.4 inches) used in conjunction with a 500 microsecond time base defines the unit length of film movement per foot of logging tool movement as $$150 \frac{2.4}{500} = 0.72 \text{ inch}$$

Thus, with 40 pulses per foot of tool movement and 0.72 inch of film movement per foot of tool movement, the oscillograms are displayed with a density of 55 traces per inch of film. There obviously is considerable latitude for departure from these parameters cited in this example. However, three critical aspects which must be fulfilled are:

(1) The intensity of acoustical impulses per foot of tool movement must be at least 12 (preferably about 40), (2) The angle $\alpha$ should be greater than 10° (preferably 30° to 45°), (3) The overall amplitude of the oscillograms must be controlled to optimize recognition of the interfering waves.

Effective photographic presentation requires maintenance of the "normal" signal level within relatively narrow amplitude limits. Excessive amplitude causes overlapping of the traces and obscuring of the events of interest. Insufficient amplitude, when carried to an extreme, is equally detrimental to our goals. Since the amplitude-versus-time character of an acoustical signal is highly dependent upon the nature of the earth formation, it is impossible to fix amplifier gain in an optimum manner for one earth formation and obtain equally fruitful results in a different earth formation. However, a specifically designed AGC (automatic gain control) system incorporated into the fracture detection system will alleviate the major problems of amplitude control.

Referring to FIGURE 2a there is shown a borehole 10 that penetrates a uniform formation 11 having a fracture 12 extending across the formation. Positioned in the borehole is a conventional acoustic velocity logging tool having a transmitter 20 and at least one receiver 21 spaced therefrom. The logging tool is of conventional design and is provided with a means for energizing the transmitter to produce acoustical impulses. Further, the transmitter circuitry should be capable of producing at least one acoustic impulse for each inch of travel of the logging tool through the borehole.

The acoustical energy travels outwardly through the borehole fluid and arrives at the receiver after having traversed the intervening distance by several different ray paths. Shown on FIGURE 2a are two particular wave types, namely, PF 23 (solid line) and FP 24 (dashed line). The nature of these diffracted or mode-converted waves has been previously discussed and summarized in Table I. It can be seen that energy traveling the ray path designated as PF 23 passes through the borehole fluid and is refracted into the formation at the critical angle. Upon encountering the fracture 12, acoustic energy is radiated into the borehole fluid and travels in that medium to the receiver. However, a portion of the energy is transmitted across the fracture and continues to travel through the formation until it arrives as a refracted wave at receiver 21. It is this arrival that is normally used to measure the velocity of compressional waves through the formation and which normally is the first acoustic energy arrival. The other wave shown, FP with path 24, travels to the fracture within the fluid and completes the remainder of its path as a refracted compressional wave. Both of the illustrated waves (PF and FP) as well as other mode-converted waves given in Table I arrive later than the refracted compressional wave and cause interference anomalies to appear within the acoustic wave train. The arrival times and relative amplitudes of the interference anomalies are a function of the spatial relationship between the logging sonde and the fracture-borehole intersection.

The receiver 21 and its associated circuitry should be capable of intercepting the acoustic waves and converting them to related electrical signals. The electrical signals should preserve the wave form and amplitude-versus-time characteristics of the received acoustic waves. The receiver circuitry is coupled by means of a lead 29 to the logging cable 36. The logging cable transmits the signals to the surface and power from the surface to the logging tool while supporting the tool in the borehole.

At the surface the logging cable passes over measuring sheave 25 which drives a Selsyn unit for determining the position of the logging tool in the borehole. Located at the surface is a power supply 26 which supplies power for operating the downhole electronics as well as the surface electronics. The surface electronic units in their preferred arrangement consist of an integrator 13, time constant control 14, sample and hold circuit 15, amplifier 16, trigger generator 22 and an oscilloscope with associated circuits 17. The function of the trigger generator is to provide two triggers $t_1$ and $t_2$ which occur at definite times with respect to the time of transmitter firing $t_0$. It is unimportant whether the transmitter firing is controlled from surface electronics or from downhole electronics. The integrator 13 is designed to integrate the area under the acoustic wave train between time $t_1$ and $t_2$ where $t_1$ is either preset or is made sensitive to the first arrival of acoustic energy by means of associated circuitry. The output of the integrator 13 is thus a voltage that grows from zero at $t_1$ to a finite voltage at $t_2$ with magnitude dependent upon the characteristics of the wave train between $t_1$ and $t_2$. Such voltage is then accumulated within the sample and hold circuit 15 in a manner dependent upon the time constant control circuit 14. The relation between $t_0$, $t_1$ and $t_2$ is shown on the typical waveform 18 of FIGURE 2b.

Simultaneous with application of acoustic signals (similar to 18) to the integrator 13, identical signals are fed to the AGC amplifier 16. A second input of the AGC amplifier consists of a control AGC signal obtained from the sample and hold circuit 15. The output of the AGC amplifier is therefore a representation of an acoustic signal where the general amplitude level between times $t_1$ and $t_2$ is controlled by the described surface electronics. It is not necessary to control the amplitude for times greater than $t_2$.

The overall objective of the AGC system consisting of either the preferred arrangement of units 13, 14, 15, 16 and 22 as shown in FIGURE 2a or consisting of alternative circuitry is to maintain the general amplitude level of a selected portion of the acoustic wave train within prescribed limits. Such action is necessary to insure an oscilloscope display compatible with optimum photographic recording. The portion of the wave train selected for oscilloscope display will usually be the time interval $t_1$ to $t_2$. The time constant control circuit 14 is instrumental in determining the effectiveness of the overall system. If the time constant is too short, i.e., much less than the time interval $t_2-t_1$, a control signal will be fed directly through the sample and hold circuit 15 as an AGC voltage to the AGC amplifier 16. The output of the AGC amplifier will therefore not exhibit an anomalous amplitude for that particular wave train. However, if the time constant is too long (i.e., such that the voltage in the sample and hold circuit is due to acoustic wave trains detected over several feet of tool movement), insensitivity to lithologic variations will result. Thus, the optimum time constant is such that pulse-to-pulse amplitude anomalies are not supressed and that sensitivity to lithologic variations which may occur within several feet is maintained.

As the tool approaches a fracture or discontinuity, amplitude anomalies occur within the acoustic wave train at times dependent upon the proximity of the logging tool to the fracture. Examination of a single oscillogram is usually not sufficient for the recognition of the interfering events. To enable visual enhancement of the interfering waves, a permanent record of the oscilloscope display is made in a specified manner by means of a recording camera 31 whose film is advanced in relation to the travel of the tool through the borehole. To accomplish this result the Selsyn unit 25 is coupled to a similar Selsyn in the recording camera system by means of a lead 32.

Referring now to FIGURES 3a and 3b there are shown typical photographic recordings that result from the system described in FIGURE 2a. FIG. 3a is a display of the portion of the wave train between the arrival of the refracted compressional wave and the shear (or pseudo-Rayleigh) wave. A similar display is shown in FIGURE 3b for the portion of the acoustic wave train beginning with the shear (or pseudo-Rayleigh) wave. These records were made by logging a carbonate section at a depth of close to 7000 feet that is known to contain steeply inclined fractures. In an unfractured section of the borehole, the close-packed oscillograms representative of adjacent positions of the logging tool show little variation with depth. However, upon encountering a fracture, interference patterns due to amplitude anomalies advance and regress through the wave train. The W pattern typical of a single near-horizontal fracture can clearly be seen in FIGURE 3b, while FIGURE 3a contains a more complex pattern typical of steeply inclined or multiple fractures. From inspection of FIGURES 3a and 3b, it is evident that the location of fractures intersecting the borehole are clearly demarked by the recording system shown in FIGURE 2a.

To provide optimum results the logging tool must be centralized in the borehole, since any displacement will vary the arrival time and amplitude of the anomaly. Also, the spectral peak of the observed acoustical frequency should be relatively low, on the order of 20 kc. to minimize centralization effects.

Referring now to FIGURE 4, there is shown a second embodiment of the invention for locating the occurrence of the amplitude anomalies. In this embodiment the downhole acoustic velocity logging tool is provided with a transmitter 42 and two receivers 43 and 44. The transmitter is located between the two receivers with the receivers being spaced equal distances from the transmitter. The tool is shown disposed in a borehole 40 that contains a horizontal fracture or interface 41. The downhole tool is shown disposed in FIGURE 4 so that the lower transmitter-receiver interval is located adjacent a relatively uniform section of the formation. In the position shown, signals detected by the upper receiver 43 will be the "normal" wave trains unaffected by the presence of fractures as illustrated by the ray path 45 for the refracted compressional wave. The lower receiver 44, however, has within its detected signal the effects of the mode-converted waves with ray paths 46 and 47.

The two receiver signals are fed into a difference amplifier 52 which can be located within the logging tool as shown in FIGURE 4 or can alternatively be located uphole. The difference amplifier output signal is equal to the difference between the amplitude-versus-time characteristics of the two receiver signals. In the system shown in FIGURE 4, the difference signal is transmitted up the logging cable 45 to the surface recording system 48. Depth reference is provided by means of Selsyn 50. The surface recording system in one embodiment can be the AGC system described in FIGURE 2a. Alternatively, the surface recording system may consist of direct photographic recording as described in FIGURE 2a, but without the AGC portion of the circuit. Finally, as a third alternative, the difference signal can be fed into an integrator similar to the one described in FIGURE 2a and a voltage generated that is proportional to the integrated area under the difference-signal wave train between time $t_1$ and $t_2$. A graphical recording of this voltage as a function of depth can then be made in the conventional manner. Such recording may exhibit the typical W pattern within the amplitude-versus-depth recording.

The logging system of FIGURE 4 is particularly applicable to formations exhibiting relatively uniform acoustic velocity. With an unfractured section the difference signal to close to zero. However, if one or both of the transmitter-receiver intervals straddle or are immediately adjacent a fracture (or fractures), cancellation of the two signals will not be effected within the difference amplifier. The output of the difference amplifier will therefore depend upon the spatial relationship between the logging tool and the fracture-borehole intersection. Consequently, fractures intersecting the borehole can be located by this logging system.

I claim as my invention:
1. A process for detecting fractures in formation penetrated by a borehole, said process comprising:
repetitively transmitting acoustic impulses and receiving the resulting trains of acoustic waves that travel between transmitting and receiving transducers located within said borehole;

producing said acoustic impulses and receiver signals at each of a series of depths that differ by less than about one inch;

detecting the amplitude-versus-time characteristics of the acoustic waves received during said series of adjacent impulse transmission;

generating electrical signals having waveforms that are analogs of the detected amplitude-versus-time characteristics of individual ones of the series of received acoustic waves;

producing a series of measurement signals from said electrical signals, said measurement signals preserving the waveforms and time-versus-amplitude characteristics of said electrical signals;

producing a series of control signals by averaging the amplitudes of a plurality of electrical signals corresponding to depth intervals that are partially included in the depth intervals of the measurement signals to which the control signals are applied;

controlling the amplitudes of the measurement signals in response to the control signals from adjacent depths; and displaying a series of said controlled measurement signals in a series of visible graphical forms, said graphical forms preserving the waveform and amplitude-versus-time characteristics of said measurement signals.

References Cited
UNITED STATES PATENTS

| | | |
|---|---|---|
| 3,083,341 | 3/1963 | White et al. |
| 3,277,438 | 10/1966 | Ford et al. |
| 3,295,100 | 12/1966 | Armistead. |
| 3,322,229 | 5/1967 | Smith. |
| 3,208,548 | 9/1965 | Levin et al. _____ 181—.5 |
| 3,369,626 | 2/1958 | Zemanek _____ 181—.5 |

BENJAMIN A. BORCHELT, Primary Examiner

J. FOX, Assistant Examiner

U.S. Cl. X.R.

340—18